(12) United States Patent
Hineno et al.

(10) Patent No.: US 7,354,261 B1
(45) Date of Patent: Apr. 8, 2008

(54) TIRE VULCANIZING APPARATUS

(75) Inventors: Yoshikatsu Hineno, Hiroshima (JP);
Toshifumi Murakami, Hiroshima (JP)

(73) Assignee: Mitsubishi Heavy Industries, Ltd. (JP)

( * ) Notice: Subject to any disclaimer, the term of this patent is extended or adjusted under 35 U.S.C. 154(b) by 0 days.

(21) Appl. No.: 11/699,391

(22) Filed: Jan. 30, 2007

(30) Foreign Application Priority Data

Nov. 20, 2006 (JP) .............................. 2006-312352

(51) Int. Cl.
*B29C 35/02* (2006.01)
(52) U.S. Cl. .......................................... 425/46; 425/47
(58) Field of Classification Search ................. 425/46, 425/47, 193, 195
See application file for complete search history.

(56) References Cited

U.S. PATENT DOCUMENTS

| | | | |
|---|---|---|---|
| 3,990,823 A | * | 11/1976 | Le Moullac .................. 425/46 |
| 5,180,592 A | * | 1/1993 | Laurent ........................ 425/46 |
| 5,492,464 A | * | 2/1996 | Irie .............................. 425/46 |
| 5,589,200 A | * | 12/1996 | Irie .............................. 425/46 |

FOREIGN PATENT DOCUMENTS

| | | |
|---|---|---|
| JP | 05-200754 | 10/1993 |
| JP | 2002-166422 | * 6/2002 |

* cited by examiner

*Primary Examiner*—James Mackey
(74) *Attorney, Agent, or Firm*—Kanesaka Berner and Partners, LLP (57) ABSTRACT

Disclosed is a tire vulcanizing apparatus including: upper and lower circular plates, to which sidewall dies for forming side portions of a tire are attached; respectively; and plural segments, to which tread dies separated as plural pieces for forming a tread portion of the tire are attached; respectively, in which apparatus, the upper and lower circular plates are held by engagement of lug portions, formed respectively on upper and lower portions of the segments, with protrusions on outer circumferential portions of the upper and lower circular plates so as to prevent the upper and lower circular plates from moving away from each other, the apparatus being constituted by providing adjustment plates, used for maintaining a measurement between the upper and lower circular plates, to an interface between the protrusion of each of the upper and lower circular plates and a corresponding one of the lug portions of each segment.

4 Claims, 8 Drawing Sheets

TIRE VULCANIZING APPARATUS

RELATED APPLICATIONS

The present application is based on, and claims priority from, Japanese Application Serial Number 2006-312352, filed Nov. 20, 2006, the disclosure of which is hereby incorporated by reference herein in its entirety.

BACKGROUND OF THE INVENTION

1. Field of the Invention

The present invention relates to a tire vulcanizing apparatus for molding and vulcanizing a green tire.

2. Description of the Related Art

In manufacture of tires, a tire vulcanizing apparatus using a self-locking container has been known as an apparatus for molding and vulcanizing a green tire. Such a tire vulcanizing apparatus is disclosed in, for example, Japanese Patent Publication No. 2505675 and Japanese Patent Application Publication No. 2001-79850.

As are described in these publications, in such a tire vulcanizing apparatus using a self-locking container, the self-locking container is a die container (a metal mold apparatus). The die container is a part for molding a tire, and basically includes an upper circular plate (a top plate), a lower circular plate (a lower plate), segments and an outer ring (a jacket). The upper circular plate and the lower circular plate retain an upper sidewall die (a metal mold) and a lower sidewall die (a metal mold), respectively. The upper sidewall die and the lower sidewall die are used for forming sidewall portions of a tire. The segments are separated from one another as plural sections, and retain tread dies (metal molds), respectively. The tread dies are used for forming a tread portion of a tire. The outer ring engages with the segments with their inclined surfaces being contact, and causes the segments to move in a radial direction thereof.

In the tire vulcanizing apparatus as described above, the die container is formed on a fixed base. The fixed base is a component member of a main body of the tire vulcanizing apparatus (hereinafter, referred to as an apparatus main body). The lower circular plate, to which the lower sidewall die is attached, is fixed to the base. The apparatus main body is provided with an elevating mechanism. In the elevating mechanism parts of the die container are elevated and lowered by means of a bolster plate, except a part corresponding to the lower circular plate. The elevating mechanism contributes also to the closing of the segments by lowering the outer ring. This elevating mechanism is provided with a mold opening/closing cylinder for opening and closing the segments. This mold opening/closing cylinder is joined to the upper circular plate, and upward and downward movements thereof cause the segment to open and close, respectively.

When a tire is caused to undergo vulcanization molding, the following is performed. A green tire is set in a mold formed of the upper sidewall die, the lower sidewall die and the tread dies. A bladder is inserted into the inner side of the green tire, and is brought into intimate contact with the green tire. Then a pressurizing/heating medium is introduced into the bladder. By introducing the pressurizing/heating medium into the bladder, the green tire is pressed against the inner surfaces of the upper and lower sidewall dies and the tread dies, by the pressurizing/heating medium contained in the bladder. The tire is formed through the vulcanization molding by maintaining this state for a predetermined length of time.

When the tire is pressurized and heated to be vulcanized, forces act on the tire in directions in which the upper and lower sidewall dies open. The forces are caused by the pressurizing/heating medium contained in the bladder introduced into the inner side of the tire. However, the upper and lower sidewall dies do not open because each of the upper and lower circular plates is held by lug portions on the segment side. Additionally, forces are generated also in directions in which the tread dies are radially expanded, and are constrained by the outer ring. Although component forces thereof act to push up the outer ring, these forces are relatively small. Accordingly, the closed state of the mold is maintained, for example, by retaining the outer ring with a cylinder. Note that a die clamping mechanism for a self-locking container is disclosed in, for example, Japanese Patent Publication No. 2505675 and the like, and that another one for others is disclosed in, for example, Japanese Patent Application Publication No. Hei10-138250 and the like.

In the tire vulcanizing apparatus as described above, for precisely molding a tire, the upper and lower sidewall dies and the tread dies should be precisely maintained in a closed state. The upper and lower sidewall dies are restrained respectively by having the lower and upper circular plates retained by the lug portions of the segments. Accordingly, it is necessary to machine, with high precision, abutting portions (contact portions) of the lug portions with the lower and upper circular plates. For this reason, there has been a problem that large amounts of time and labor are required for machining of the segments and the upper and lower circular plates. Additionally, there has been a problem that wear and the like of these abutting portions make it impossible to secure the precision.

SUMMARY OF THE INVENTION

An object of the present invention is to solve the problems as described above in the conventional tire vulcanizing apparatuses, and to make it possible to ensure, with a simple structure, that the dimensional accuracy between the upper and lower circular plates be maintained.

A tire vulcanizing apparatus according to a first aspect of the present invention for solving the abovementioned problems includes a self-locking container. The self-locking container includes upper and lower circular plates, a plurality of segments and an annular jacket. Sidewall dies for forming side portions of a tire are attached to the upper and lower circular plates, respectively. A plurality of tread dies for forming a tread portion of the tire are attached to the plurality of segments, respectively. The plurality of tread dies are separated from one another as plural pieces. The annular jacket engages with the segments with their inclined surfaces being in contact with the annular jacket, and is capable of moving the segments in radial directions by moving upward and downward. Lug portions are formed on upper and lower portions of each of the segments, and a protrusion is formed on an outer circumference portion of each of the upper and lower circular plates. The self-locking container causes the lug portions to engage respectively with the protrusions, and thereby holds the upper and lower circular plates so as to prevent the upper and lower circular plates from moving away from each other at a time when the dies are closed by moving the segments inward in the radial directions. The tire vulcanizing apparatus according to the first aspect is characterized in that adjustment plates for maintaining a measurement between the upper and lower circular plate are provided to interfaces between the protrusion of each of the upper and lower circulate plates and the lug portions on the corresponding portions of the segments.

A tire vulcanizing apparatus according to a second aspect of the present invention for solving the abovementioned problems is as follows. In the tire vulcanizing apparatus according to the first invention, the adjustment plates are attached to each of the upper circular plate and the lower circular plate.

A tire vulcanizing apparatus according to a third invention for solving the abovementioned problems is as follows. In the tire vulcanizing apparatus according to any one of the first and second inventions, each of the adjustment plates is composed of separate plates separated from one another as plural pieces.

With the tire vulcanizing apparatus according to the first aspect, the adjustment plates are provided: to the interfaces between the lug portions of the segments and the protrusions of the upper and lower circular plates. Thereby, the dimensional accuracy between the upper and lower circular plates during pressurized vulcanization is maintained. Accordingly, the distance between the upper and lower circular plates can be maintained precisely, and relatively easily. Eventually, this makes it possible to manufacture tires having higher precision quality as final products than otherwise. Additionally, it becomes unnecessary to machine, with high precision, contact portions of the upper circular plate and each of corresponding one of the lug portions with each other, and contact portions of the lower circular plate and each of corresponding one of the lug portions with each other. Accordingly, a reduction in time required for the machining, and in manufacturing costs can be pursued. Furthermore, by performing maintenance on the adjustment plates, it is possible to perform precision adjustment and precision maintenance on the distance between surfaces to which the upper and lower sidewall dies are attached, respectively. When any one of the adjustment plates has worn, all that is required is to replace the worn adjustment plate with new one. For this reason, maintenance with high precision can be made inexpensively as well as easily.

With the tire vulcanizing apparatus according to the second aspect, the adjustment plates are provided to both of the upper and lower circular plates to which the upper and lower sidewall dies are fixed, respectively. Accordingly, both of the sidewall dies can be precisely positioned with respect to the tread dies.

With the tire vulcanizing apparatus according to the third aspect, fabrication and attachment of the adjustment plates can be facilitated because the adjustment plates are separated from one another. Additionally, local wear and the like of the segments and the upper and lower circular plates can be prevented by setting a separating position between each adjacent two of the separate plates corresponding to a gap between some adjacent two of the segments.

BRIEF DESCRIPTION OF THE DRAWINGS

The present invention will become more fully understood from the detailed description hereinbelow and the accompanying drawings which are given by way of illustration only, and thus are not limitative of the present invention, and wherein.

DETAILED DESCRIPTION OF THE INVENTION

Hereinbelow, a tire vulcanizing apparatus according to the present invention will be described in detail based on an embodiment.

Figure 1:
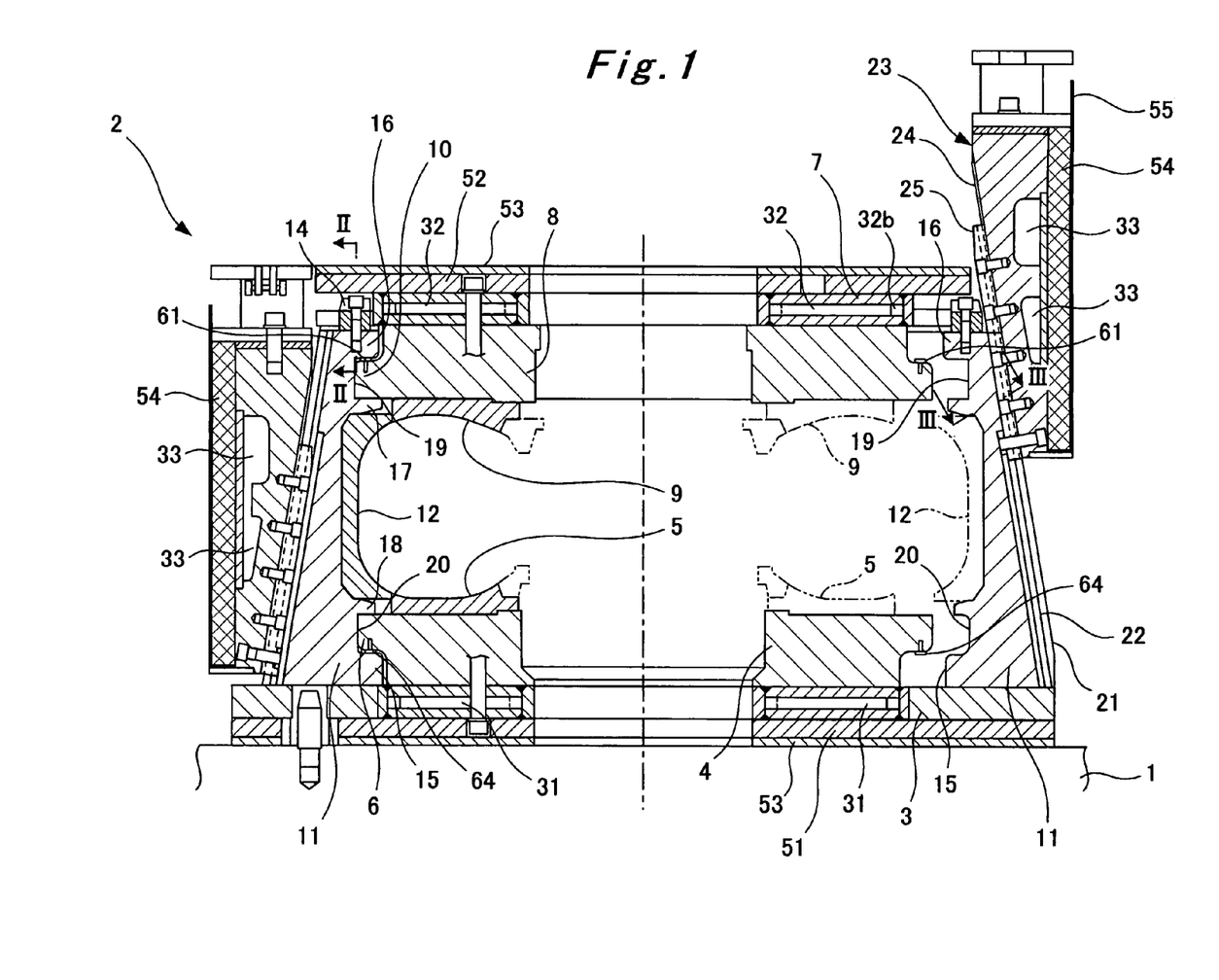
FIG. 1 is a cross-sectional view of a container part of a tire vulcanizing apparatus according to one embodiment example of the present invention, and shows, in the left side thereof with respect to the center line, a state where segments are closed, and, in the right side thereof with respect to the center line, a state where the segments are opened.

An apparatus main body of the tire vulcanizing apparatus is provided with a fixed base 1. A die container 2 as a self-locking container is formed on the base 1. A lower platen 3 is fixed to the base 1. The lower platen 3 is an annular circular plate serving as a base of the die container 2. A lower circular plate (a lower plate) 4 having an annular shape is attached concentrically to the lower platen 3. A lower sidewall die 5 is attached to an upper surface of the lower circular plate 4. The lower sidewall die 5 is a lower die for molding one of sidewalls of the tire. A protrusion 6 for a self-locking purpose is formed on an upper portion of an outer circumferential surface of the lower circular plate 4. Note that, an unillustrated central mechanism is installed in the central portion of the lower platen 3 and the lower circular plate 4, from the base 1 side. The central mechanism is provided with a bladder (a rubber bag.) A pressurizing/heating medium for molding and vulcanizing a green tire from the inside thereof is to be inserted into the bladder.

On the other hand, an unillustrated bolster plate is supported above the base 1. The bolster plate can be elevated and lowered with respect to the base 1 by an elevating device which is provided to the apparatus main body. An upper platen 7, which is an annular circular plate, is supported on a tip of a piston rod of a cylinder provided to the bolster plate. An upper circular plate (a top plate) 8 having an annular shape is attached concentrically to a lower surface of the upper platen 7. An upper sidewall die 9 is attached to a lower surface of the upper circular plate 8. The upper sidewall die 9 is an upper die for molding the other one of the sidewalls of the tire. A protrusion 10 for a self-locking purpose is formed on a lower portion of an outer circumferential surface of the upper circular plate 8.

Segments 11 are positioned to the outside of the lower circular plate 4 and the upper circular plate 8. The segments 11 are separated from one another in a circumferential direction as plural pieces (9 pieces in the present embodiment). In addition, tread dies 12 for forming a tread of the tire are attached to the inner surfaces of the respective segments 11. The segments 11 are supported by the upper platen 7 in a manner that the segments 11 are able to radially slide.

Figure 2:
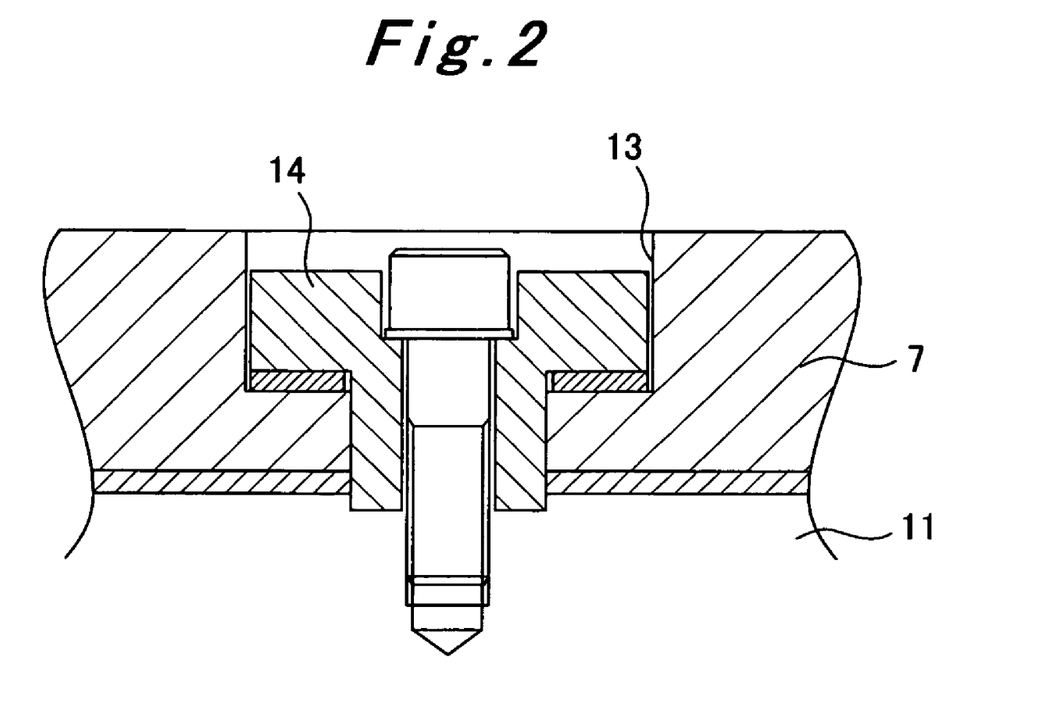
FIG. 2 is a cross-sectional view taken along the line II-II in FIG. 1, the cross-sectional view showing a structure of a key between each of the segments and an upper platen.

FIG. 2 shows a structure with which the segments 11 are supported by the upper platen 7 in a manner that the segments 11 are able to radially slide. T-shaped grooves 13 are radially formed in a surface of the edge portion of the upper platen 7. Here, the number of the T-shaped groove 13 is the same as those of the segments 11. On the other hand, T-shaped keys 14 are fixed respectively to top surfaces of the segments 11. Each of these T-shaped keys 14 is slidably fitted into the corresponding T-shaped groove 13. That is, the segments 11 are held by the engagement of the T-shaped keys 14 with the T-shaped grooves 13. Accordingly, the segment 11 can move outward and inward in the radial direction (in radially expanding and contracting manners) with respect to the upper and lower plates 4 and 8. In a state where all of the plural segments 11 are closed (a part on the left side with respect to the center line in FIG. 1), the plural tread dies 12 unite and form an annular shape. The plural tread dies 12 thus become a die corresponding to a tread portion of the tire. Note that, in order to ease the radial movements of the segments 11, a low-friction material is attached to an upper surface of the lower platen 3, a lower surface of the upper platen 7, and upper surfaces of the T-shaped grooves 13.

On an inner surface of each of the segments 11, a lug portion 15 for self-locking is formed in a lower portion thereof and a lug portion for self-locking 16 is formed in an upper portion thereof. The lug portion 15 can engage with a lower surface of the protrusion 6 for self-locking of the lower circular plate 4. The lug portion 16 can engage with an upper surface of the protrusion 10 for self-locking of the upper circular plate 8. The lug portions 15 and 16 form concaved grooves 19 and 20, respectively, and the lug portions 15 and 16 also form upper and lower lug portions 17 and 18, respectively. The tread dies 12 are attached between these upper and lower lug portions 17 and 18, and these grooves 19 and 20 are configured so that the protrusions 6 and 10 can fit thereinto, respectively.

Figure 3:
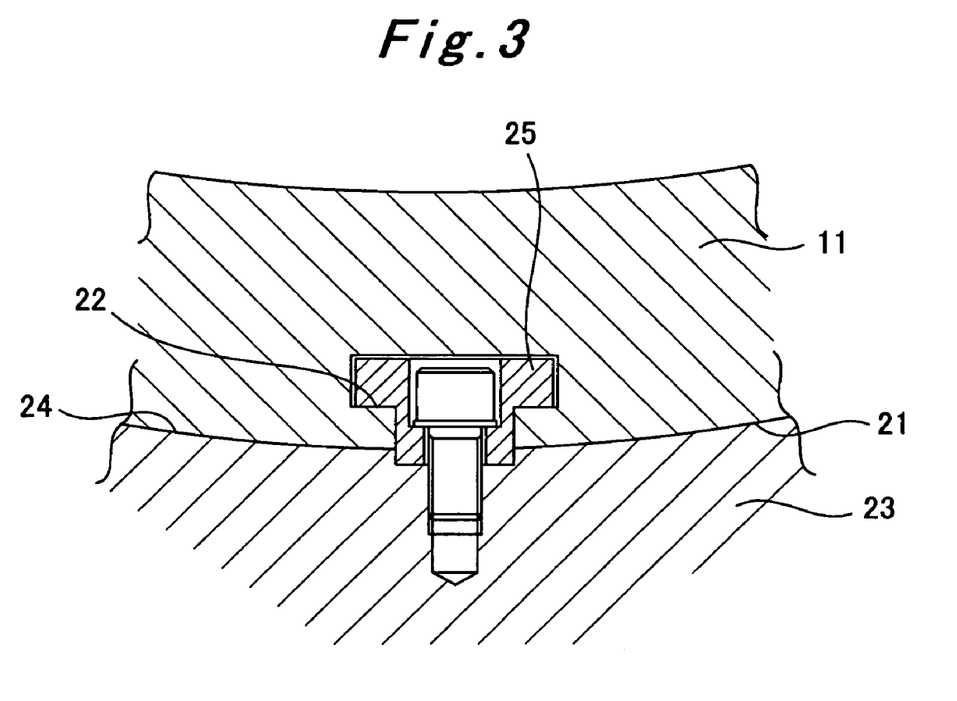
FIG. 3 is a cross-sectional view taken along the line III-III in FIG. 1, the cross-sectional view showing the structure of the key between each of the segments and a jacket.

As shown in FIGS. 1 and 3, an outer surface 21 of each of the segments 11 is formed into an inclined surface obliquely expanding outward in a direction from the upper end to the lower end, and also is formed into an arc surface in a horizontal direction. In the center portion of this outer surface 21, a T-shaped groove 22 is formed in a vertical direction. On the other hand, a jacket (an outer ring) 23 having a tubular shape is positioned to the outside of the segments 11, and an inner side surface 24 of the jacket 23 has a shape fitting the outer surfaces 21. T-shaped keys 25 are attached to the inner surface 24 of the jacket 23 by means of bolts. These T-shaped keys 25 are inserted respectively into the T-shaped grooves 22 of the corresponding segments 11. Accordingly, each of the segments 11 and the jacket 23 are configured so as to slide against each other with the corresponding key 25 and the corresponding T-shaped groove 22.

An upper portion of the jacket 23 is joined to the aforementioned bolster plate with an unillustrated joining member interposed in between. Accordingly, the jacket 23 is capable of moving upward and downward along with the bolster plate by means of the elevating device provided to the apparatus main body.

The die container 2 of the tire vulcanizing apparatus according to this embodiment is provided with a supply system. The supply system supplies, to the die container 2 itself, a heating medium (such as vapor, a mixed gas of vapor and an inert gas, or warm water) serving for vulcanization of the tire. Specifically passages 31, 32 and 33 for supplying the heating medium are formed respectively in the lower platen 32, the upper platen 7 and the jacket 23.

The die container 2 is configured to have a heat-insulating structure. That is, a lower heat-insulating plate 51 is provided as a heat-insulating material on the lower surface of the lower platen 3, and an upper heat-insulating plate 52 is provided as a heat-insulating material on the upper surface of the upper platen 7. On surfaces of the upper and lower heat-insulating plates 52 and 51, metallic plates 53 are placed additionally in order to protect them. A heat-insulating material 54 is placed also on all over an outer circumferential surface of the jacket 23. The heat-insulating material 54 is placed on an inner surface of a metallic tubular body 55.

Figure 4:
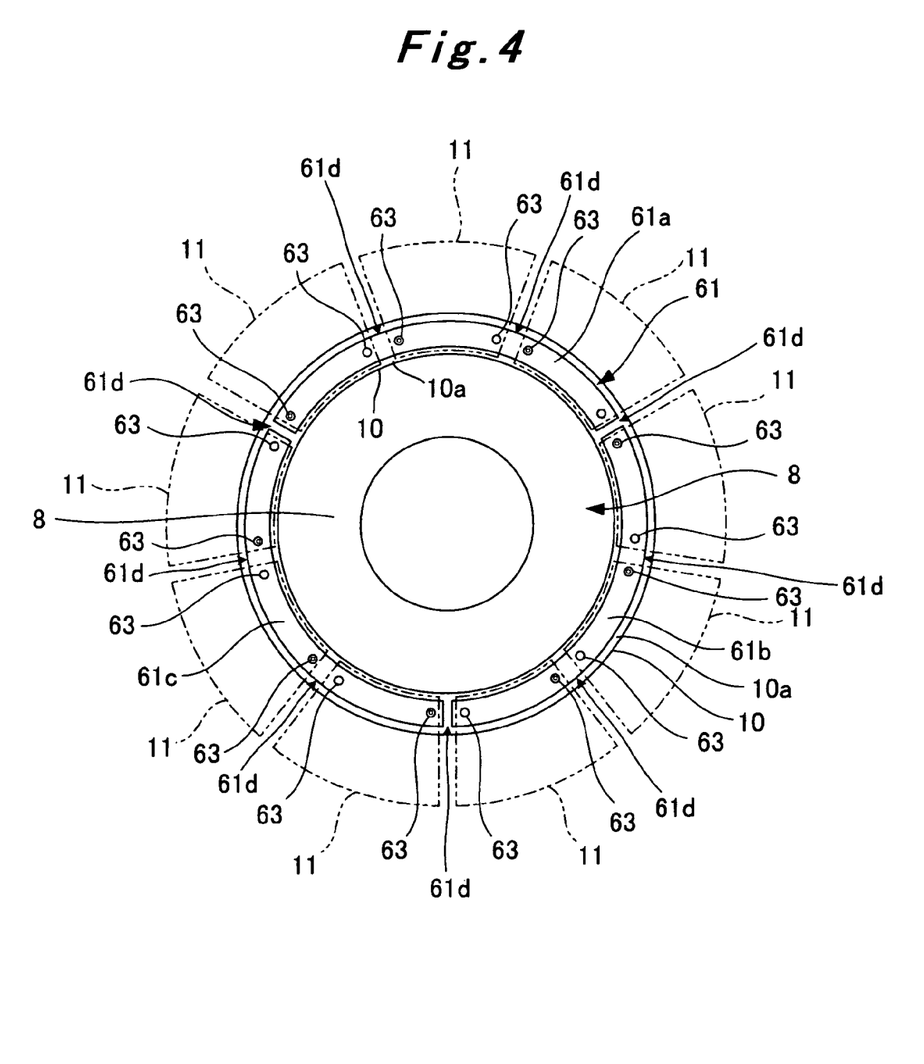
FIG. 4 is a plan view of a protrusion of an upper circular plate.
Figure 5:
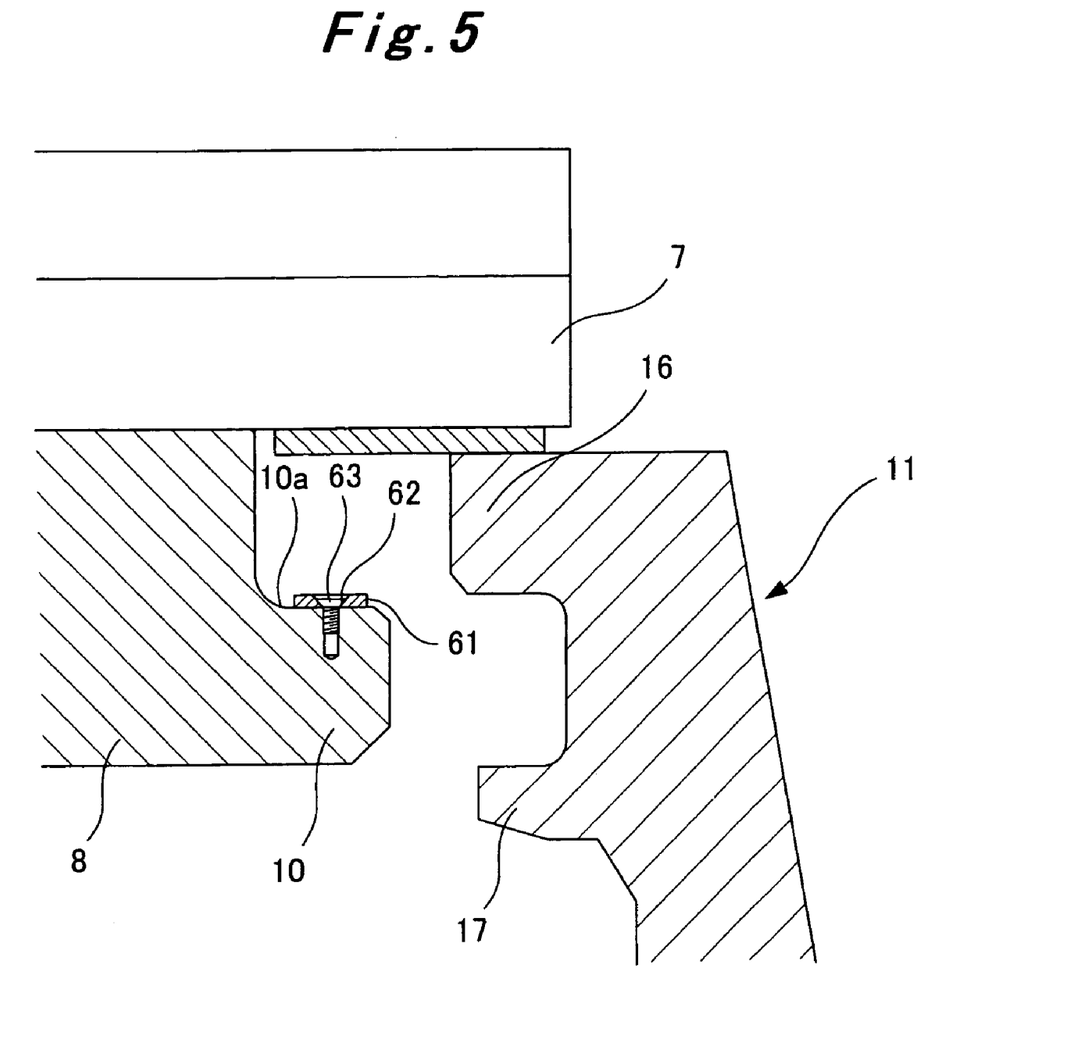
FIG. 5 is an enlarged view of the protrusion of the upper circular plate, and lug portions of each of the segments, which are shown in FIG. 1.
Figure 6:
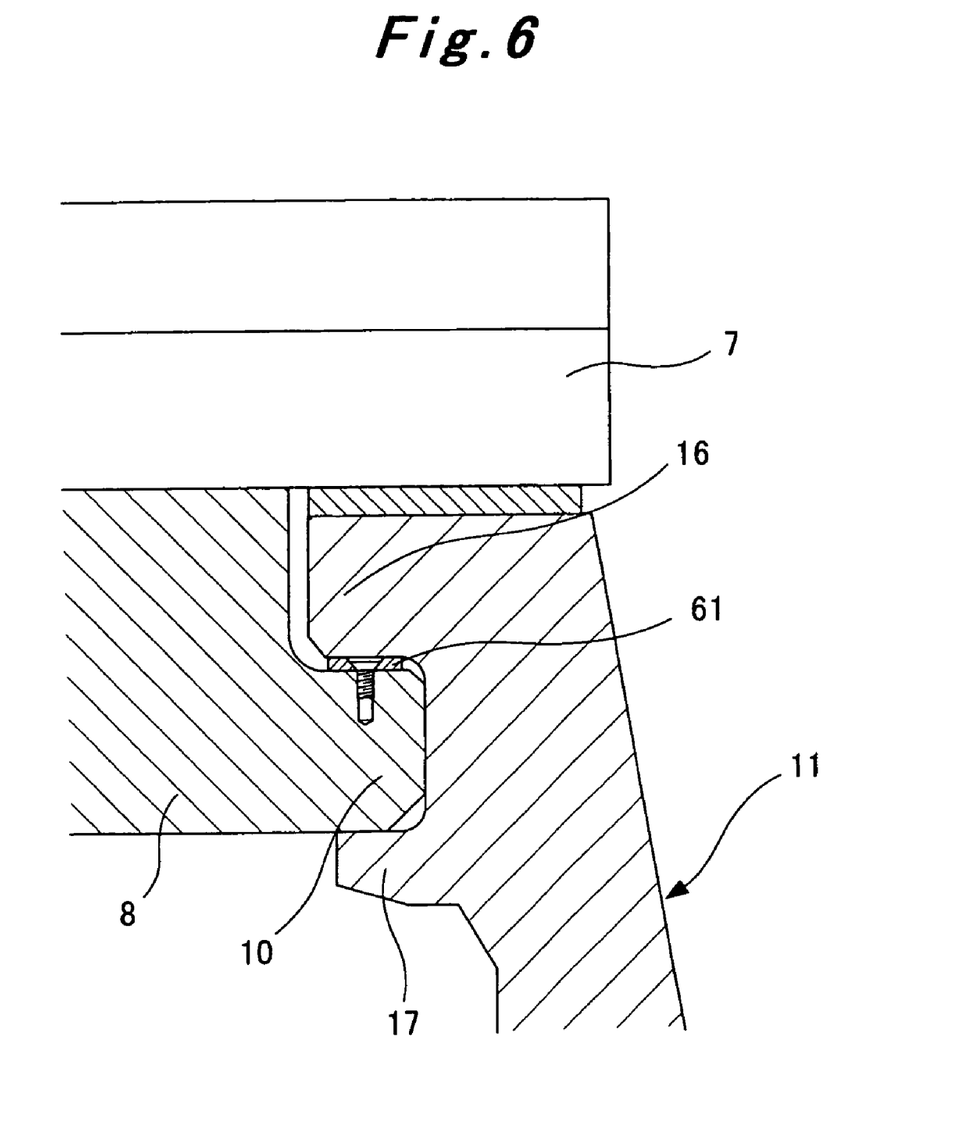
FIG. 6 is a cross-sectional view of the same part as shown in FIG. 5 when the part is in a state different from a state shown in FIG. 5.

As shown in FIGS. 4 to 6, an upper-portion adjustment plate 61 is attached as an adjustment plate to an upper surface 10*a* of the protrusion 10 of the upper circular plate 8. The upper-portion adjustment plate 61 is separated into three parts, arch-shaped separate plates 61*a*, 61*b* and 61*c*, as shown in FIG. 4. Assumes that arch-shaped separate plates 61*a*, 61*b* and 61*c* are combined together to form an annular shape. The separate plates 61*a* to 61*c* are formed of a metal such as steel. The separate plates 61*a* to 61*c* are screwed to the upper circular plate 8. For the purpose of preventing heads of the screws from sticking out from front surfaces of the separate plates 61*a* to 61*c*, tapered countersunk holes 62 are formed in the separate plates 61*a* to 61*c*. Then the separate plates 61*a* to 61*c* are fixed, through the tapered countersunk holes 62, to the upper circular plate 8 using flat-head screws 63. Since the separate plates 61*a* to 61*c* are pressed against the lug portions 16, only the minimum number of locations for the fixation by means of the flat-head screws 63 are required. Each of the separate plates 61*a* to 61*c* is arranged so as to correspond to three of the segments 11. That is, the separate plates 61*a* to 61*c* are arranged so that a separating position 61*d* between each adjacent two of the separate plates 61*a* to 61*c* can correspond to a gap between some adjacent two of the segments 11.

Figure 7:
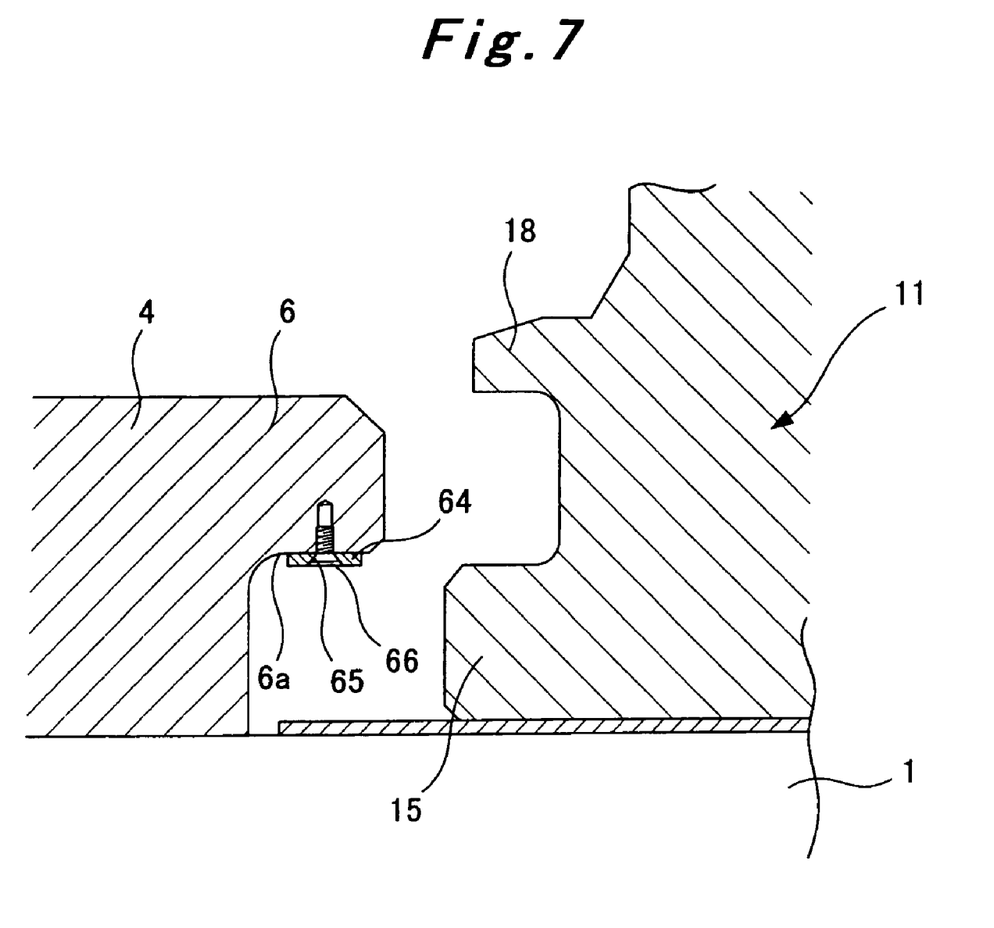
FIG. 7 is an enlarged view of a protrusion of a lower circular plate, and lug portions of each of the segments, which are in shown in FIG. 1.
Figure 8:
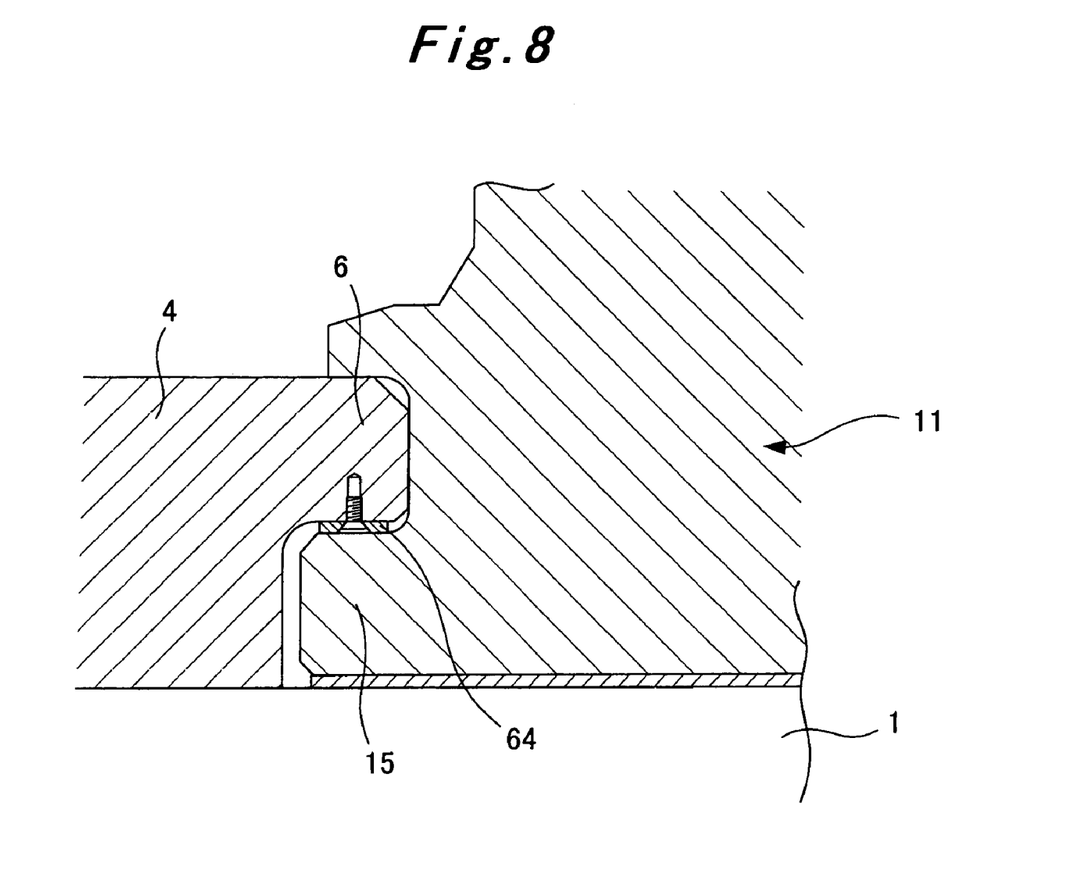
FIG. 8 is a cross-sectional view of the same part as shown in FIG. 7 when the part is in a state different from a state shown in FIG. 7.

Likewise, as shown in FIGS. 7 and 8, a lower-portion adjustment plate 64 is attached as an adjustment plate also to a lower surface 6*a* of the protrusion 6 of the lower circular plate 4. As in the case with the upper-portion adjustment plate 61, the lower-portion adjustment plate 64 is also separated into three parts. Assumes that the arch-shaped separate plates are combined together to form an annular shape. The lower-portion adjustment plate 64 is fixed to the lower circular plate 4 by means of flat-head screws 66 through tapered countersunk holes 65. Each of the separate plates composing the lower-portion adjustment plate 64 is arranged so as to correspond to three of the segments 11. That is, each of the separate plates is arranged so that a separating position between each adjacent two of the separate plates can correspond to a gap between some adjacent two of the segments 11.

Thicknesses of the upper-portion adjustment plate 61 and the lower-portion adjustment plate 64 are determined as follows. Specifically, the thicknesses are determined so that a distance between the upper circular plate 8 and the lower circular plate 4 to which these sidewall dies 9 and 5 are fixed respectively can be maintained at a predetermined value in a case where the upper and lower sidewall dies 9 and 5 are pressurized during pressurized molding of the tire.

Next, molding and vulcanization of a green tire by using this tire vulcanizing apparatus will be described.

Before the green tire is carried in, the lower circular plate 4 having the lower sidewall die 5 attached thereto, and the like are fixed on the base 1 of the apparatus main body. The upper circular plate 8 having the upper sidewall die 9 attached thereto, the segments 11 having the tread dies 12 attached thereto, the jacket 23, and the like are kept above on standby by the elevating device with which the apparatus main body is provided. Note that, at this time, vapor is supplied as the heating medium to the passage 31 of the lower platen 3. The vapor is supplied also to the passages 32 and 33 respectively of the upper platen 7 and the jacket 23, which are kept above on standby.

The green tire is carried in into a space above the lower sidewall die 5 from a side by an unillustrated tire loading apparatus, and then, is lowered to be placed on the lower sidewall die 5.

Once the green tire is carried in, the upper circular plate 8 having the upper sidewall die 9 attached thereto, the segments 11, and the like are lowered along with the aforementioned bolster plate by the elevating device of the apparatus main body. As shown in the right side with respect to the center line in FIG. 1, the upper sidewall die 9 is positioned above the lower sidewall die 5 at the same time as lower end surfaces of the segments 11 are placed on the lower platen 3. At this time, the segments 11 are in an opened state being restrained by the jacket 23 positioned above them.

When the bolster plate is further lowered by the elevating device, the jacket 23 is lowered. The segments 11 are pressed by the inner surface 24 of the jacket 23 being lowered. Then, the segments 11 are guided by the engagement of the keys 14 on the upper surfaces of the segments 11 with the T-shaped grooves 13 of the upper platen 7, to move inward in the radial direction. Along with the inward movement of the segments 11, the grooves 19 and 20 on the inner surfaces thereof fit the protrusion 6 of the lower circular plate 4 and the protrusion 10 of the upper circular plate 8, respectively. In addition, the tread dies 12 attached to the segments 11 are annularly integrated to form a die for molding a tread of the tire. Moreover, a space for molding the tire is formed by having the tread dies 12 combined also with the upper and lower sidewall dies 9 and 5. Then, the lug portions 16 on the upper portions of the segments 11 face the upper-portion adjustment plate 61 provided on the upper surface of the protrusion 10 of the upper circular plate 8. Concurrently, the lug portions 15 on the lower portions of the segments 11 face the lower-portion adjustment plate 64 provided on the lower surface of the protrusion 6 of the lower circular plate 4. Note that, along with a further lowering movement of the bolster plate, the cylinder being connected to the upper circular plate 8 and serving for opening movements of the segments 11 is closed.

Along with the lowering movement of the upper circular plate 8 and the inward movements of the segments 11, the bladder is set inside the die, which bladder is provided to the base 1 side, and which sticks out from a hole in the center of the lower platen 3 into the space above the lower sidewall die 5 attached to the lower circular plate 4.

Thereafter, the pressurizing/heating medium (vapor or the like) for vulcanization is supplied into the bladder. Then the green tire is pressurized and heated from the inside by means of the bladder. As a result, the green tire is vulcanized at the same time as being molded into a shape corresponding to a space formed by the upper and lower sidewall dies 9 and 5 and the tread dies 12. High-temperature vapor is supplied also into the passages 32 and 31 respectively of the upper and lower platens 7 and 3, and into the passage 33 of the jacket 23. For this reason, heat is conducted to the upper and lower sidewall dies 9 and 5 through the upper and lower platen 7 and 3 and through the upper and lower circular plates 8 and 4. Moreover, heat is conducted also to the tread dies 12 through the jacket 23 and the segments 11. Accordingly, both of the sidewall portions and the tread portion of the tire are vulcanized by being heated also from the outside thereof.

During molding and vulcanization of the tire, forces in directions, in which a distance between the upper and lower sidewall dies 9 and 5 is expanded, act upon the upper and lower sidewall dies 9 and 5 due to the pressurizing/heating medium supplied to the inside of the tire with the bladder. However, the upper and lower sidewall dies 9 and 5 are not opened in the following manner. The lug portions 15 of the segments 11 abut the lower-portion adjustment plates 64 attached to the lower surface 6a of the protrusion 6 of the lower circular plate 4. The lug portions 16 of the segments 11 abut the upper-portion adjustment plates 61 attached to the upper surface 10a of the protrusion 10 of the upper circular plate 8. Accordingly, the lug portions 16 and the lug portions 10 hold a portion corresponding to the distance between the lower circular plate 4 and the upper circular plate 8 with the distance being maintained at a predetermined measurement. That is, the die container 2 is clamped (self-locked) due to a pressure of the pressurizing/heating medium supplied to the inner side of the bladder. The thicknesses of the upper and lower adjustment plates 61 and 64 are adjusted so that the distance between the upper and lower circular plates 8 and 4 can be maintained at the predetermined measurement when the die container 2 is thus clamped.

Note that the thicknesses of the upper-portion adjustment plate 61 provided on the protrusion 10 of the upper circular plate 8, and of the lower-portion adjustment plates 64 provided on the protrusion 6 of the lower circular plate 4 are selected as follows. A measurement of the distance between the upper and lower circular plates 8 and 4 can be adequately measured in a state where the upper and lower adjustment plates 61 and 64 abuts the lug portions 16 and 15 of the segments 11 with forces in the same directions as pressures acting upon the upper and lower circular plate 8 and 4 being added thereto by means of a jack or the like.

Upon completion of the molding and vulcanization, the pressurizing/heating medium inside the bladder is discharged. Then, the upper and lower sidewall dies 9 and 5 and the tread dies 12 are opened to take out the finished tire. When the tire is taken out, the cylinder (having been contracted at the time of lowering the jacket 23) connected to the upper circular plate 8 is caused to operate in a direction in which the piston rod is extended. The extruding force of this cylinder acts upon the segments 11 through the upper platen 7. The cylinder moves upward along with the bolster plate having the cylinder is attached thereto, and along with the jacket 23 due to a reactive force because the lower end surfaces of the segments 11 are placed on the fixed lower platen 3. By having the jacket 23 moving upward, the segments 11 connected to the jacket 23 with the keys 25 and the T-shaped grooves 22 in between move outward in the radial direction while sliding with respect to the inner surface of the jacket 23 moving upward. As in the case of being radially contracted, the segments 11 are guided by the keys 14 on the upper portions of the segments 11 and by the T-shaped grooves 13 of the upper platen 7 to move.

When the cylinder extrudes the piston rod by a predetermined amount, the segments 11 are opened by a predetermined amount, and the upper lug portions 16 and 15 of the segments 11 become free from the protrusions 10 and 6 of the upper and lower circular plates 8 and 4. That is, the upper and lower sidewall dies 9 and 5 are released from restraint thereon in a vertical direction, a state shown in the right side with respect to the center line in FIG. 1 is brought about. Although not being illustrated, the tread dies 12 are separate from the tread portion of the molded tire.

Thereafter, each of the jacket 23, the segments 11, the upper circular plate 8 and the like is retreated to a predetermined upward position by elevating the bolster plate by means of the elevating device of the apparatus main body. The tire becomes uncovered placed on the lower sidewall die 5, and then, is gripped and carried out by a tire carrying-out device entering from a side.

According to the tire vulcanizing apparatus according to this embodiment, it is possible to maintain the dimensional accuracy between the upper and lower circular plates 8 and 4 during pressurized vulcanization by providing the adjustment plates 61 and 64 on the protrusions 10 and 6 of the upper and lower circular plates 8 and 4. Accordingly, the distance between the upper and lower circular plates 8 and 4 can be maintained precisely, and relatively easily as well. Thereby, it is possible to maintain the precision quality of tires as final products. Additionally, it is unnecessary to so severely control precision in machining: the upper surface of the protrusion 10 and the lower surfaces of the lug portions 16 which are surfaces of the upper circular plate 8 and the lug portions 16 abutting each other; and the lower surface of the protrusion 6 and the upper surfaces of the lug portions 15 which are surfaces of the lower circular plate 4 and the lug portions 15 abutting each other. Thereby, time and labor required for the machining can be saved, and a cost reduction in the tire vulcanization apparatus can be pursued.

Furthermore, in this embodiment, since each of the adjustment plates 61 and 64 is separated into three parts, handling of the adjustment plates 61 and 64 is facilitated. For this reason, attachment and detachment of the adjustment plates are eased. Additionally, the separating position 61d between each adjacent two of the separate parts of each of the adjustment plates 61 and 64 is set corresponding to a gap between some adjacent two of the segments, no force acts upon the separating position 61d of each of the adjustment plates 61 and 64. Accordingly, local wear and the like become less likely to be generated, on the upper and lower lug portions 16 and 15 of the segments 11, and on the protrusions 10 and 6 of the corresponding upper and lower circular plates 8 and 4.

With the tire vulcanizing apparatus according to this embodiment, precision adjustment and precision maintenance of the distance between surfaces, respectively to which the upper and lower sidewall dies 9 and 5 are attached, can be performed by performing maintenance on the adjustment plates 61 and 64. The precision maintenance is facilitated because, when any one of the adjustment plates has been abraded, all that is required is to replace the abraded adjustment plate with new one.

Each of the adjustment plates 61 and 64 is configured to be separated into three parts in the abovementioned embodiment, or the each may be one-piece. In addition, the number of parts into which the each is separated is not limited to three. The adjustment plates may be provided to the segments 11 instead of the side of the upper circular plate 8 and the lower circular plate 4. That is, the adjustment plates may be provided, for example, to the upper surfaces of the lug portions 15 of the segments 11, and to the lower surfaces of the lug portions 16 thereof, respectively. In this case, the segments 11 are formed as separate pieces, it is necessary that a part of each of the adjustment plates be provided with respect to each of the segments 11. Furthermore, the sides to which the adjustment plates are provided in the upper and lower parts may be made different. For example, the adjustment plates may be provided to the upper surface of the protrusion 10 of the upper circular plate 8 in the upper part, and to the upper surfaces of the lug portions 15 of the segments 11 in the lower part. With this manner, attachment and replacement operations of the adjustment plates become operations performed from above, and are facilitated.

This invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tire vulcanizing apparatus using a self-locking container including:
   upper and lower circular plates, to which sidewall dies for forming side portions of a tire are attached respectively;
   a plurality of segments, to which a plurality of tread dies for separated from one another as plural pieces for forming a tread portion of the tire are attached respectively; and
   an annular jacket, which engages with the segments with their inclined surfaces being in contact, and which is capable of moving the segments in radial directions by moving upward and downward,
   the self-lock container, causing lug portions formed on upper and lower portions of each segments to engage respectively with protrusions on outer circumferential portions of the corresponding upper and lower circular plates, and thereby to hold the upper and lower circular plates so as to prevent the upper and lower circular plates from moving away from each other, at a time when the dies are closed by moving the segments inward in the radial direction, the tire vulcanizing apparatus wherein
   adjustment plates for maintaining a measurement between the upper and lower circular plates are provided to interfaces between the protrusion of each of the upper and lower circular plates and the lug portions on the corresponding portions of the segments.

2. The tire vulcanizing apparatus according to claim 1, wherein the adjustment plates are attached to each of the upper and the lower circular plates.

3. The tire vulcanizing apparatus according to claim 1, each of the adjustment plates is composed of separate plates separated from one another as plural pieces.

4. The tire vulcanizing apparatus according to claim 2, each of the adjustment plates is composed of separate plates separated from one another as plural pieces.

* * * * *